US010526863B2

(12) United States Patent
Gabriele et al.

(10) Patent No.: US 10,526,863 B2
(45) Date of Patent: Jan. 7, 2020

(54) DOPED BIODEGRADABLE ELASTOMER FOR DOWNHOLE APPLICATIONS (71) Applicants: THE SECANT GROUP, LLC, Telford, PA (US); CDI ENERGY PRODUCTS, INC., Humble, TX (US)

(72) Inventors: Peter D. Gabriele, Frisco, TX (US); Dennis Shull, Pipersville, PA (US); Fred B. Pippert, Sugar Land, TX (US)

(73) Assignees: THE SECANT GROUP, LLC, Telford, PA (US); CDI ENERGY PRODUCTS, INC., Humble, TX (US)

( * ) Notice: Subject to any disclaimer, the term of this patent is extended or adjusted under 35 U.S.C. 154(b) by 0 days.

(21) Appl. No.: 15/995,777

(22) Filed: Jun. 1, 2018

(65) Prior Publication Data
US 2018/0347307 A1 Dec. 6, 2018

Related U.S. Application Data (60) Provisional application No. 62/514,050, filed on Jun. 2, 2017.

(51) Int. Cl.
E21B 33/12 (2006.01)
E21B 33/134 (2006.01)
E21B 43/22 (2006.01)
C08L 67/00 (2006.01)

(52) U.S. Cl.
CPC .......... *E21B 33/1208* (2013.01); *C08L 67/00* (2013.01); *E21B 33/134* (2013.01); *C08K 2201/018* (2013.01)

(58) Field of Classification Search
CPC .... E21B 33/1208; E21B 33/134; E21B 33/00; C09K 5/00; C09K 8/035
See application file for complete search history.

(56) References Cited

U.S. PATENT DOCUMENTS

| 5,641,562 A | 6/1997 | Larson et al. |
| 8,338,508 B2 | 12/2012 | Shi et al. |
| 2003/0040574 A1 | 2/2003 | Schertz et al. |
| 2008/0149351 A1 | 6/2008 | Marya et al. |

(Continued)

FOREIGN PATENT DOCUMENTS

| WO | 2016/032621 A1 | 3/2016 |
| WO | 2016/204822 A1 | 12/2016 |

OTHER PUBLICATIONS

R. Daly et al., "Microbial metabolisms in a 2.5-km-deep ecosystem created by hydraulic fracturing in shales," Nature Microbiology, Article No. 16146, vol. 1; Sep. 5, 2016, 9 pgs.

(Continued)

Primary Examiner — Zakiya W Bates
(74) Attorney, Agent, or Firm — McNees Wallace & Nurick LLC (57) ABSTRACT Compositions and methods are beneficial for use in downhole applications, especially oil and gas well bores. A composition includes an elastomer doped with a dopant. The presence of the dopant increases a rate of microbial degradation of the elastomer by a microbe. A method includes forming an article including a doped polymer. The doped polymer includes an elastomer doped with a dopant. The method also includes placing the article in a service environment. The presence of the dopant in the doped polymer increases a rate of microbial degradation of the elastomer by a microbe in the service environment.

22 Claims, 3 Drawing Sheets (56) References Cited

U.S. PATENT DOCUMENTS

| | | |
|---|---|---|
| 2008/0277109 A1 | 11/2008 | Vaidya |
| 2009/0074999 A1 | 3/2009 | Hiruma et al. |
| 2009/0084539 A1 | 4/2009 | Duan et al. |
| 2010/0081730 A1 | 4/2010 | Unseld et al. |
| 2011/0277996 A1 | 11/2011 | Cullick et al. |
| 2013/0025859 A1 | 1/2013 | Liang et al. |
| 2013/0324676 A1 | 12/2013 | Wang |
| 2014/0060843 A1 | 3/2014 | Murphy et al. |
| 2015/0090156 A1 | 4/2015 | Combs et al. |
| 2015/0285026 A1 | 10/2015 | Frazier |
| 2016/0251540 A1 | 9/2016 | Nicholson et al. |
| 2016/0298412 A1 | 10/2016 | Fripp et al. |
| 2017/0016298 A1 | 1/2017 | Takahashi et al. |
| 2017/0234103 A1 | 8/2017 | Frazier |
| 2017/0349747 A1 | 12/2017 | Sherman et al. |

OTHER PUBLICATIONS

Liu et al., "Synthesis and Characterization of a Biodegradable Poly(glycerol-glycol-sebacate) Terpolymer", Advanced Materials Research, vols. 476-478, pp. 2075-2078, 2012.
International Search Report and Written Opinion for PCT/US2018/035619, dated Jul. 31, 2018, 17 pages.

DOPED BIODEGRADABLE ELASTOMER FOR DOWNHOLE APPLICATIONS

CROSS-REFERENCE TO RELATED APPLICATIONS

This application claims priority to and the benefit of U.S. Provisional Application No. 62/514,050 filed Jun. 2, 2017, which is hereby incorporated by reference in its entirety.

FIELD OF THE INVENTION

The present application is generally directed to compositions and articles tailored for use in an application in a specific physical, chemical, or microbial service environment. More particularly, the present application is directed to biodegradable elastomers doped with an agent for controlled degradation through a combination of physical hydrolysis and metabolic processing by indigenous microflora found in wellbore and other downhole applications, as well as sealing elements and other articles made from such elastomers.

BACKGROUND OF THE INVENTION

The "downhole tools" market is a significant part of the oil and gas industries and includes articles like sealing elements, gaskets, bridge plugs, frack plugs, frack balls, pipes, and others. A sub-segment of this market includes resin and fibers used in composites to make such articles. As energy exploration and other scientific pursuits of subterranean and sub-oceanic (i.e. "downhole") exploration evolve, materials used in those tools can accumulate in the same environments being explored. Accumulation over time can alter as well as pollute that environment.

Thus, it is desired to have man-made materials that can be utilized in engineering processes but that once the intended use has ended, for the material to remain in place and remediate by natural biologic or physical mechanisms. One such example is hydraulic fracking materials left downhole in wellbores for a functionally limited period of service. These include plugs and other kinds of sealing elements that degrade after their service period.

Various features and advantages of the present invention will be apparent from the following more detailed description, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

BRIEF DESCRIPTION OF THE INVENTION

What is needed is an elastomer that degrades within a reduced time period in a service environment after the elastomer is no longer needed in its primary role in the service environment.

In one embodiment, a composition includes an elastomer doped with a dopant. The presence of the dopant increases a rate of microbial degradation of the elastomer by a microbe.

In another embodiment, a method includes forming an article including a doped polymer. The doped polymer includes an elastomer doped with a dopant. The method also includes placing the article in a service environment. The presence of the dopant in the doped polymer increases a rate of microbial degradation of the elastomer by a microbe in the service environment.

DETAILED DESCRIPTION OF THE INVENTION

Provided are compositions and methods for expedited degradation or bioremediation of articles including elastomers in service environments such as a downhole environment.

Exemplary embodiments provide a doped elastomer with a dopant that increases the degradation rate of the elastomer by promoting microbial degradation. The dopant may be a chemical dopant, a biological dopant, or a combination of a chemical dopant and a biological dopant. In some embodiments, the biological dopant is a bacterium or a fungus.

Embodiments of the present disclosure, for example, in comparison to concepts failing to include one or more of the features disclosed herein, provide efficient hydrolytically degradable elastomers, provide doped polymers with an increased degradation rate, provide articles tailored to microbes in a service environment, provide polymers with dual susceptibility to degradation by both physical hydrolysis and biological enzymatic degradation, or combinations thereof. In some embodiments, the microbe is a bacterium. In other embodiments, the microbe is a fungus.

Some downhole tools already contemplate the use of biodegradable resins as an environmentally attractive solution based on the presumption that the polymeric and/or non-polymeric compositions of matter are remediated and returned to the carbon cycle solely by physical hydrolysis. However, for many applications the utility of the material in the composition is not deliberately designed or even understood in the true context of biodegradability as degradation or remedial resorption.

Predominant forms of current "biodegradable" resins used in downhole applications include polyglycolides (PGA) and polylactides (PLA) to form degradable polymer composites and compounds for such sealing and tooling elements, with a current industry preference for PGA. Although PGA and PLA degrade, they are not truly biologically remediated. In addition, PGA is a brittle plastic polymer that can be plasticized or co-blended with the lactide polycaprolactone, but never reaches the engineering properties to resemble an elastomer. This limits the availability of PGA in sealing elements. Thus, while the properties of an elastomer may be desired, there are no efficient hydrolytically degradable elastomers in the resin market.

Some elastomers, such as poly(glycerol sebacate) (PGS), are biodegradable elastomers known primarily for medical applications. PGS is a biodegradable elastomer with known surface erosion and degradation profiles in vitro and in vivo. PGS has an advantage over lactides and glycolides in that the PGS modulus has true elastomeric properties, whereas lactides and glycolides are considered plastic and rigid. Another advantage of PGS over PGA and PLA is that PGS has a considerable extent of customizable engineering properties, such as modulus and degree of crosslinking. Traditional lactides and glycolides, as well as other "biodegradable" esters, amides, ethers, and the like have functional linkages that present limited flexibility in elastomeric polymer design. PGS thereby has engineering advantages that are lacking in lactides and glycolides.

Another advantage of PGS is that the component monomers, glycerol and sebacic acid, formed by hydrolytic degradation of PGS, are cellular metabolites themselves. Glycerol is a metabolic building block for lipids, and sebacic acid is the natural metabolite intermediate in w-oxidation of medium and long-chain fatty acids.

Nevertheless, the temporal quality of post-service degradation may also hinder the choice of a biodegradable or other man-made degradable polymer in engineering use such as is described herein. Thus, because PGS exhibits surface erosion, it may not degrade quickly enough to function properly in the downhole applications for which it might be employed. For example, in some embodiments it may be desirable for degradation to occur within a two-week time period, which may be too slow for the surface erosion of a particular component made of neat PGS or another biodegradable elastomer.

Exemplary embodiments recognize that the degradation mechanisms of some polymeric materials may occur by microbial metabolic (anabolic and catabolic) processes and that through the doping of elastomeric materials, biodegradable elastomers that show dual susceptibility to degradation by both physical hydrolytic as well as biologic enzymatic mechanisms may be created to give a product with desired properties while maintaining control with respect to temporal characteristics of the degradation.

Exemplary embodiments deliberately design polymers and other compositions of matter that include materials of construction specifically formed to accelerate remediation following service use by including specific and/or generalized chemical dopants, such as, for example, trophic agents, biologics, nutritional compositions, nutritional stimulants, and biologic stimulants, such as, for senescent or non-mitotic microbes, and physical chemistries including co-blended compositions as bio-temporal accelerants in the degradation mechanisms of these polymers. Preferably, the dopants are selected based on local endogenous and indigenous ecosystems in which the articles formed from the elastomer are to be employed.

Polymeric systems of PGS and other biodegradables thus include selected dopants that encourage either microbial attack or a combination of microbial and physical chemistry necessary for degradation and remediation at a desired point during service without compromise to the engineering features of the polymer elastomeric properties for which it is initially employed. Additionally, while primarily discussed with polymers including PGS (including neat PGS as well as PGS copolymers), it will be appreciated that the principles of the invention may be employed with other biodegradable polymers, both elastomeric and plastic, as well as what would otherwise be considered non-biodegradable polymers, but which may be sensitized or induced to biodegrade in the presence of support nutrition for microbes present in the service environment, where the microbes are present either naturally or by seeding in the polymer.

Many biodegradable resins are limited in their engineering application as a result of the limited manipulation of polymer morphology. Further, biodegradation is often used informally to refer to any polymers that degrade, disperse, or solubilize. Among the advantages of exemplary embodiments is that with the use of PGS as a preferred elastomer, degradation also includes subsequent remediation of degradation products. That is, PGS elastomers have an additional advantage in that such compositions can be hydrolyzed and degraded by indigenous microorganism communities and the resulting degradation products can themselves be remediated by the same organismal communities. Exemplary embodiments may be particularly useful in downhole applications but can support a host of green technologies in which environmental or economic service desires or dictates a remedial use of materials. Degradation, as used herein, should be construed to include both biological and physical processes of breakdown, remediation, metabolism, oxidation, hydrolysis, photodegradation, photolysis, thermodegradation, thermolysis, and any like mechanism of reassimilation of carbon-based materials into the ecological cycle.

Exemplary embodiments control the temporal and engineering properties in accordance with the local ecology and are not limited to downhole applications. Deep sea, wetland, forest, and other above-ground or surface environments may also benefit from articles made from polymers doped in accordance with exemplary embodiments for controlled degradation. The article may be of any crosslinked or un-crosslinked polymeric or elastomeric material, for which biodegradation is desirable after a useful lifespan of the article has ended. In some embodiments, the biodegradation bioremediates the article. Furthermore, an article for use in a wellbore for purposes of water well drilling may present an entirely different family of microbes, requiring a different profile of dopants or composition of matter than hydraulic fracturing. Thus, it will be appreciated that a wide variety of agents may be employed as a dopant and that selection of a particular dopant for a particular application may first require identification of an indigenous microbial community in the application environment.

In some embodiments, the doping includes the seeding of one or more microbes in the biodegradable elastomer as a biological dopant. In such embodiments, the biological dopant may be seeded in a senescent state or in a state of suspended animation, such as a spore. In some such embodiments, the biological dopant is encapsulated. In some such embodiments, the biological dopant is a prokaryote. In other such embodiments, the biological dopant is a eukaryote. In some such embodiments, the biological dopant is a bacterium. In other such embodiments, the biological dopant is a fungus. When the polymer is doped with a chemical dopant and a biological dopant, the dopants are preferably selected to be complementary to each other.

In some embodiments, the biological dopant is genetically engineered. The biological dopant may be genetically engineered to lack a specific gene that makes it dependent on a chemical dopant in the composition. Alternatively, the biological dopant may be genetically engineered to include a gene not naturally present that aids in the biodegradation of the polymer.

For example, microbial ecosystems, including both microflora and corresponding metabolites or nutritional stimulants, have been identified downhole in hydraulic fracking wells (see, e.g., Daly et al., "Microbial metabolisms in a 2.5-km-deep ecosystem created by hydraulic fracturing in shales", *Nature Microbiology*, Vol. 1, October 2016 pp. 1-9, which is hereby incorporated by reference in its entirety). Combining the nutritional requirements of indigenous microbiota with the engineering properties of the required service of the polymer targets the polymer for microbiotic attack.

Thus, in some embodiments, bacterial microbes in the local ecology may include, but are not limited to, *Allochromatium, Arcobacter, Cobetia, Marinobacterium, Pseudo-*

*alteromonas, Pseudomonas, Idiomarina, Thermococcus, Halolactobacillus, Vibrio, Celeribacter, Pelobacter, Frackibacter, Halanaerobium, Halomonadaceae, Marinobacter, Methanohalophilus, Methanolobus*, or combinations thereof. In other embodiments, other bacterial microbes may be present in the local ecology.

In other embodiments, one or more fungal microbes, such as, for example, yeasts or molds, are present in the local ecology.

In some embodiments, the chemical dopants include, but are not limited to, nutritional stimulants, minerals, enzymes, glycine betaine, trimethyl amine, dimethyl amine, monomethyl amine, methanol, ethylene glycol, sucrose, fructose, glucose, maltose, lactate, acetate, amino acids, such as, for example, alanine, or combinations thereof.

In such cases, ethylene glycol or other metabolites may be used as a chemical dopant in the PGS in such amounts to provide a desired temporal degradation for a particular application, which may be different, for example, in forming different types of sealing elements even within the same application. For example, a plug and a gasket may not have the same desired degradation profile even when used in the same downhole bore.

The dopant loading may be selected to achieve a predetermined rate of degradation. In some embodiments, the dopant loading, with respect to the weight of the doped polymer, is at least 0.1%, alternatively at least 0.5%, alternatively at least 1%, alternatively about 0.1% to about 5%, alternatively about 0.1% to about 1%, alternatively about 0.1% to about 0.5%, alternatively about 0.5% to about 1%, alternatively about 0.5% to about 2%, alternatively about 1% to about 5%, or any value, range, or sub-range therebetween.

Thus, for a specific application, a composition for the customized temporal degradation through the use of local intrinsic and indigenous microbial communities may be provided. The microbial community known or expected to be present in a service environment and a specific corresponding dopant appropriate for the microbial community may be identified. A polymer (plastic or elastomer) with the appropriate properties, such as, for example, viscoelasticity, flexibility, mineral composition, acid number, degree of crosslinking, two-part ratio, or free hydroxyl levels, for the application is synthesized with the dopant. The doped polymer is then cured, molded, extruded, or otherwise formed into an article for use in the desired applied engineering process (e.g. capping and plugging). Microbes degrade the polymer in situ in the service environment.

In exemplary embodiments, the polymer is a polyester copolymer of an alcohol monomer and an acid monomer.

In some embodiments, the alcohol monomer is a polyalcohol monomer. In some embodiments, the polyalcohol monomer is a diol monomer. In some embodiments, the polyalcohol monomer is a triol monomer. In some embodiments, the alcohol monomer is glycerol.

In some embodiments, the acid monomer is a diacid monomer. The diacid monomer may include a compound of the formula [$HOOC(CH_2)_nCOOH$], where n=1-30. In some embodiments, the acid monomer may include malonic acid, succinic acid, glutaric acid, adipic acid, pimelic acid, suberic acid, azelaic acid, sebacic acid, or a combination thereof. In some embodiments, the diacid is sebacic acid.

The initial formation of the elastomer may be by any suitable method. In some embodiments, the formation is water-mediated. In some embodiments, the water-mediated process is similar to that disclosed in U.S. Pat. No. 9,359,472, which is hereby incorporated by reference in its entirety. When the elastomer includes PGS or another polymer of a polyalcohol monomer and a diacid monomer, it may be desirable to charge a polyalcohol monomer, such as glycerol, and water to a vessel in a molar ratio, water to polyalcohol monomer, of about 1:1 or greater, alternatively about 1:1 to about 4:1, alternatively about 2:1 to about 4:1, alternatively about 2:1 or greater, alternatively about 3:1, or any value, range, or sub-range therebetween. A diacid monomer, such as sebacic acid, is added to the vessel in a molar ratio, polyalcohol monomer to diacid monomer, of about 0.9:1 to about 1:0.9, alternatively about 1:1, or any value, range, or sub-range therebetween.

A dopant, such as ethylene glycol, is added in a molar ratio, polyalcohol to dopant, of about 5:1 to about 100:1, alternatively about 5:1 to 20:1, alternatively about 8:1 to about 12:1, alternatively about 10:1, or any value, range, or sub-range therebetween. The dopant may be added to the vessel with the polyalcohol monomer, after the polyalcohol monomer but before the diacid monomer, with the diacid monomer, after the diacid monomer, or at any other appropriate time depending, for example, on the desired loading, the desired polymeric structure, or the desired molecular weight.

The mixture is then heated to a temperature of about 50 to 200° C. (122 to 392° F.), preferably to a temperature of about 140° C. (284° F.) or greater in order to melt the diacid. The mixture is heated for about 1 hour or more and may be stirred while heating. The vessel may be under an inert gas, such as nitrogen or argon, or under a vacuum while it is being heated. After the mixture is heated, it is stirred at an elevated temperature to distribute the contents of the mixture. The stirring step may last up to 1 hour or more. The vessel may be kept under an inert atmosphere while the mixture is being mixed to homogeneity. After the mixture is dispersed, the water is removed by distillation.

Distillation may be achieved by heating the mixture, or by putting the vessel under a vacuum, or both. The temperature of the vessel may be about 100 to 200° C. (212 to 392° F.) or preferably about 130 to 150° C. (266 to 302° F.). The pressure of the vessel may be about 760 Torr or lower. In exemplary embodiments, the pressure is less than 20 Torr. The distillation is continued until the polymer reaches a desired average molecular weight, or until no more water is distilled. The removal of water from the vessel allows the monomers to react, thus by the end of the distillation the polymer has been synthesized.

In another embodiment, glycerol, ethylene glycol, and water are combined in a vessel at a molar ratio of about 1:0.1:3 respectively. Sebacic acid is then added at about a 1:1 molar ratio with glycerol, and the vessel heated under nitrogen to about 160° C. (320° F.) for about 1 hour. After the mixture is heated, the mixture is stirred at about 130° C. (266° F.), under nitrogen for about 1 hour to thoroughly disperse the mixture until it is homogeneous. The reaction vessel is then purged with nitrogen for about 24 hours at about 120° C. (248° F.). After the system has been purged, a vacuum of about 10 Torr is applied to the vessel while maintaining a temperature of about 120° C. (248° F.) or higher for about 26 hours.

In another embodiment, lactic acid and sebacic acid are combined so that the resulting polymer is an ethylene glycol-doped poly(glycerol sebacate-lactic acid) (PGSLA) copolymer while in yet another embodiment, an isocyanate is added to produce a poly(glycerol sebacate-urethane) (PGSU) copolymer.

The use of PGSLA as an optional base resin may be desirable to provide super-elastic behavior combined with accelerated degradation. The copolymerized PLA in the copolymer may accelerate degradation over neat PGS, because PLA degradation occurs primarily by bulk erosion and PGS degradation occurs primarily by surface erosion. The copolymer thus may improve both degradation and elongation. The use of PGSU may be desirable, as the presence of nitrogen in the urethane may further accelerate degradation in environments in which attacking microbes cannot fix nitrogen.

Any articles may be formed with the doped polymeric compositions described herein. A particular benefit is contemplated for use in downhole applications and particularly in forming primary seals (i.e. packers) and other secondary seals in frack plugs used in the performance of hydraulic fracturing of oil and gas well bores and other subterranean and sub-oceanic applications in the oil and gas markets.

In some embodiments, the doped polymeric composition forms part of a downhole tool of a well system similar to those disclosed in U.S. Patent Application Publication No. 2016/0298412 and U.S. Patent Application Publication No. 2017/0234103, which are hereby incorporated by reference in their entirety.

Figure 1:
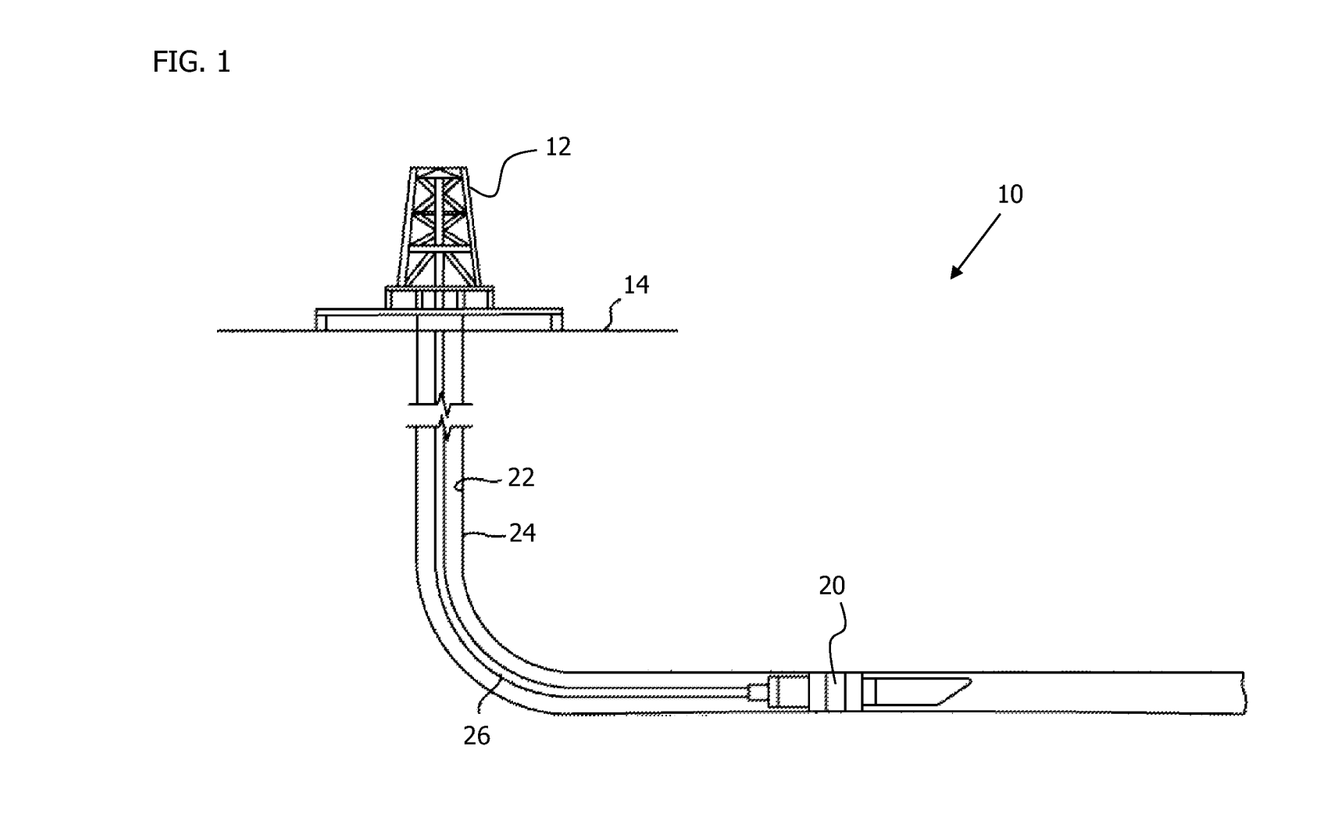
FIG. 1 shows a well system including a downhole tool in an embodiment of the present disclosure.

Referring to FIG. 1, a well system 10 includes a service rig 12 at the surface 14 and a downhole tool 20 located in a horizontal section of a wellbore 22 underground. The wellbore 22 is lined by a casing 24 and a conveyance 26 connects the downhole tool 20 to the service rig 12.

Figure 2:
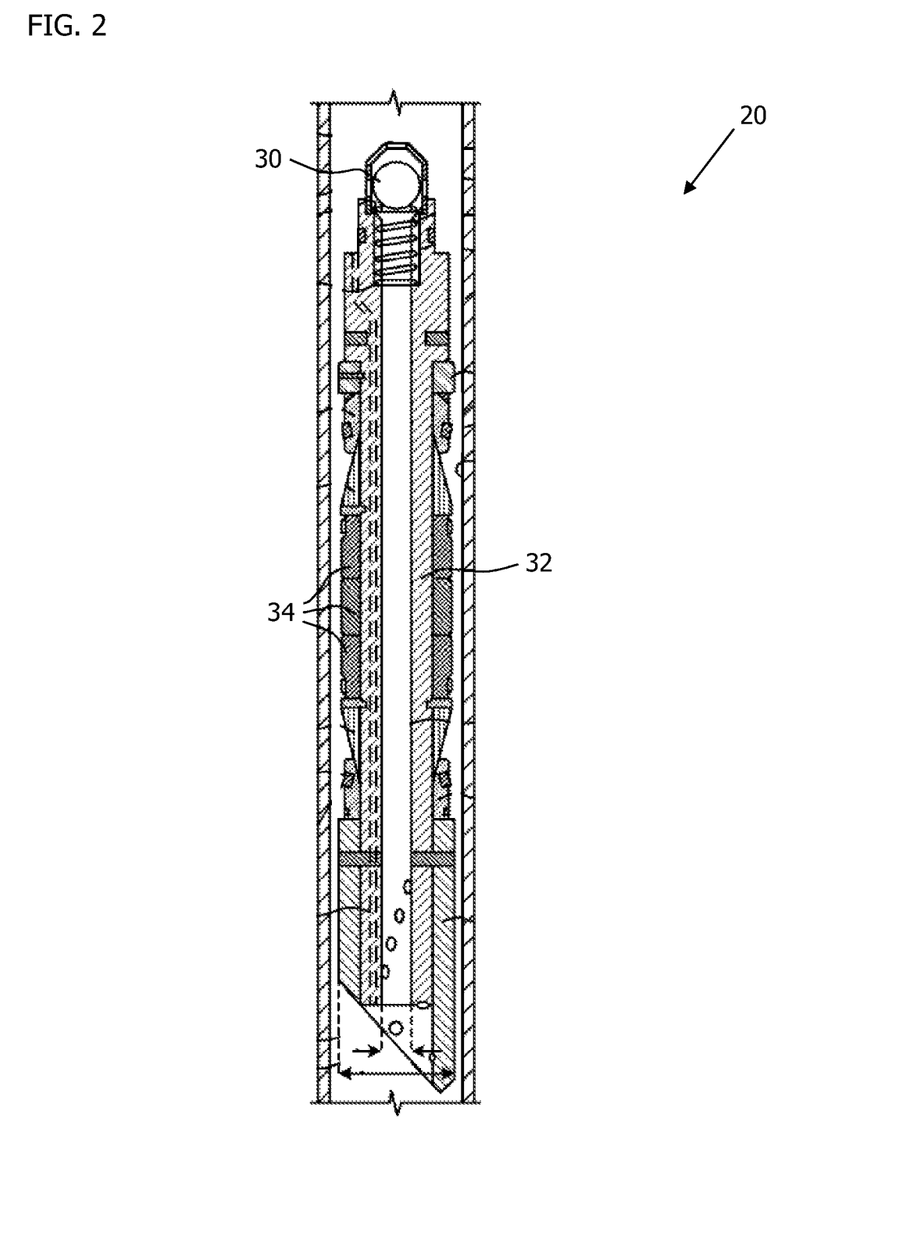
FIG. 2 shows the downhole tool of the well system of FIG. 1 in an embodiment of the present disclosure.
Figure 3:
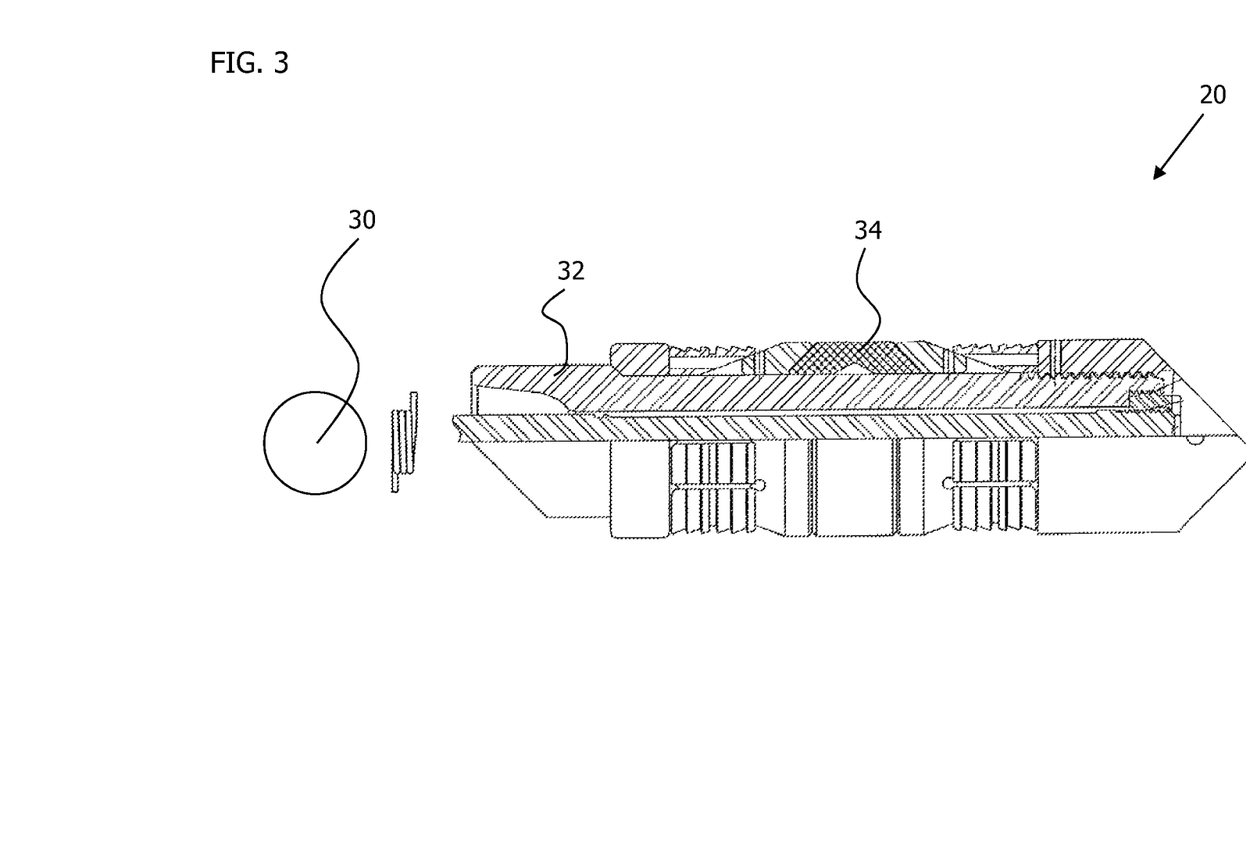
FIG. 3 shows the downhole tool of the well system of FIG. 1 in another embodiment of the present disclosure.

Referring to FIG. 2 and FIG. 3, the downhole tool 20 includes at least one component formed of a doped polymeric composition. Components that may be formed of a doped polymeric composition may include, but are not limited to, a sealing ball 30, a mandrel 32, and one or more center sealing elements 34.

In one embodiment, a doped elastomer is used in forming a rubber packer seal element for use in hydraulic fracturing having a soft inner portion that forms the primary seal and having a 70-80 durometer hardness that can expand radially by about 0.500 inches or less. The rubber packer seal element material may have a tensile strength of about 2500 psi, an elongation of about 250%, and an E100 modulus of about 550 psi.

A harder seal may be employed on either side of the softer seal to prevent extrusion. The harder seal may have about a 90 durometer hardness, a tensile strength of about 3000 psi, an elongation of about 175%, and an E100 modulus of about 2000 psi.

The seals are sent down the well bore sequentially and set by hydraulic or mechanical force. The seals then must remain functional for 24 to 48 hours in aqueous fluid at about 121° C. (250° F.), and then seal 10,000 to 15,000 psi pressure from the hydraulic fluid for 2 to 8 hours.

In exemplary embodiments, the plug and all seals degrade in the aqueous environment in less than two weeks so that they may be pumped out of the well bore to allow for product free flow.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A composition comprising an elastomer doped with a dopant, wherein a presence of the dopant increases a rate of microbial degradation of the elastomer by a microbe, wherein the elastomer comprises a polymer selected from the group consisting of ploy(glycerol sebacate), poly(glycerol sebacate-lactid acid), and poly(glycerol sebacate-urethane).

2. The composition of claim 1, wherein the dopant is selected to increase the rate of microbial degradation of the elastomer in a predetermined service environment.

3. The composition of claim 2, wherein the predetermined service environment is a downhole environment.

4. The composition of claim 3, wherein the elastomer is in a cured form having predetermined physical properties for an application of the composition in the downhole environment.

5. The method of claim 1, wherein the dopant is a chemical dopant selected from the group consisting of trophic agents, nutritional compositions, nutritional stimulants, and biologic stimulants for the microbe.

6. The composition of claim 1, wherein the dopant is a chemical dopant selected from the group consisting of a mineral, an enzyme, an amino acid, glycine betaine, trimethyl amine, dimethyl amine, monomethyl amine, methanol, ethylene glycol, alanine, sucrose, fructose, glucose, maltose, lactate, acetate, and combinations thereof.

7. The composition of claim 1, wherein the dopant is a biological dopant selected from the group consisting of a bacterium, a fungus, and a combination thereof.

8. The composition of claim 1, wherein the microbe is a prokaryote.

9. The composition of claim 1, wherein the microbe is a bacterial microbe selected from the group consisting of *Allochromatium, Arcobacter, Cobetia, Marinobacterium, Pseudoalteromonas, Pseudomonas, Idiomarina, Thermococcus, Halolactobacillus, Vibrio, Celeribacter, Pelobacter*, Frackibacter, *Halanaerobium*, Halomonadaceae, *Marinobacter, Methanohalophilus, Methanolobus*, and combinations thereof.

10. The composition of claim 1, wherein the microbe is a eukaryote.

11. The composition of claim 1, wherein the microbe is a fungal microbe.

12. The composition of claim 1, wherein the elastomer is loaded with at least 0.1% of the dopant, by weight of the elastomer.

13. The composition of claim 1, wherein the dopant is selected to match with the microbe.

14. The composition of claim 1, wherein the elastomer comprises a poly(glycerol sebacate).

15. The composition of claim 1, wherein the elastomer comprises poly(glycerol sebacate-lactic acid).

16. The composition of claim 1, wherein the elastomer comprises poly(glycerol sebacate-urethane).

17. A method comprising:
combining a dopant, a polyalcohol monomer, a diacid monomer, and water to form a mixture;
heating and removing water from the mixture to form a doped polymer, the doped polymer comprising an elastomer doped with the dopant;
forming an article comprising the doped polymer; and
placing the article in a service environment, wherein a presence of the dopant in the doped polymer increases a rate of microbial degradation of the elastomer by a microbe in the service environment.

18. The method of claim 17, further comprising selecting the dopant based on the microbe or the service environment.

19. The method of claim 17 further comprising selecting the elastomer based on at least one physical characteristic of the elastomer for an application of the article in the service environment.

20. The method of claim 17, wherein the service environment is a downhole environment.

21. The method of claim 17, wherein the polyalcohol monomer and the diacid monomer are at a molar ratio in the range of 0.9:1 to 1:0.9 in the elastomer.

22. The method of claim 17, wherein the elastomer comprises a polymer selected from the group consisting of poly(glycerol sebacate), poly(glycerol sebacate-lactaid acid), and poly(glycerol sebacate-urethane).

\* \* \* \* \*

UNITED STATES PATENT AND TRADEMARK OFFICE
CERTIFICATE OF CORRECTION

PATENT NO.         : 10,526,863 B2
APPLICATION NO.    : 15/995777
DATED              : January 7, 2020
INVENTOR(S)        : Peter D. Gabriele, Dennis Shull and Fred B. Pippert Page 1 of 1

It is certified that error appears in the above-identified patent and that said Letters Patent is hereby corrected as shown below:

In the Claims

Claim 1, Line 5, replace "ploy(glycerol sebacate)" with -- poly(glycerol sebacate) --

Claim 1, Line 6, replace "sebacate-lactid" with -- sebacate-lactic --

Signed and Sealed this
Fifth Day of May, 2020

Andrei Iancu
*Director of the United States Patent and Trademark Office*